(12) United States Patent
Saito

(10) Patent No.: US 8,665,541 B2
(45) Date of Patent: Mar. 4, 2014

(54) EVALUATION METHOD OF PERPENDICULAR MAGNETIC RECORDING MEDIUM AND MANUFACTURING METHOD OF PERPENDICULAR MAGNETIC RECORDING MEDIUM

(75) Inventor: Chiyo Saito, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 131 days.

(21) Appl. No.: 13/383,160

(22) PCT Filed: Jun. 22, 2010

(86) PCT No.: PCT/JP2010/060525
§ 371 (c)(1),
(2), (4) Date: Apr. 9, 2012

(87) PCT Pub. No.: WO2011/004700
PCT Pub. Date: Jan. 13, 2011

(65) Prior Publication Data
US 2012/0194936 A1 Aug. 2, 2012

(30) Foreign Application Priority Data

Jul. 10, 2009 (JP) .................................. 2009-164086

(51) Int. Cl.
*G11B 5/596* (2006.01)
(52) U.S. Cl.
USPC ........................................................... 360/31
(58) Field of Classification Search
USPC ................ 360/31, 53, 25, 17, 131, 72.02, 69, 360/77.06; 369/53.41, 53.36, 53.44, 53.31
See application file for complete search history.

(56) References Cited

U.S. PATENT DOCUMENTS

| 6,468,670 | B1 | 10/2002 | Ikeda et al. |
| 6,819,511 | B2 * | 11/2004 | Nishikawa ...................... 360/17 |
| 2007/0263312 | A1 | 11/2007 | Hara et al. |

FOREIGN PATENT DOCUMENTS

| JP | 2002-092865 A | 3/2002 |
| JP | 2007-220204 A | 8/2007 |
| JP | 2008-84498 A | 4/2008 |
| WO | WO 2006/092836 A1 | 9/2006 |

* cited by examiner

*Primary Examiner* — Nabil Hindi

(57) ABSTRACT

A characteristic evaluation method of a perpendicular magnetic recording medium suitable for obtaining a perpendicular magnetic recording medium which can respond to much higher recording density is provided.
This is an evaluation method of a perpendicular magnetic recording medium, including a process of recording a first signal of a specific frequency at an arbitrary first position in the perpendicular magnetic recording medium; a process of measuring a reproduction output of the first signal and of measuring a signal/noise ratio (initial value) of the first signal at a peak position where the reproduction output becomes the maximum; a process of recording a signal of a specific frequency at a second position away from the first position by a predetermined distance in the radial direction of the perpendicular magnetic recording medium; a process of measuring the signal/noise ratio of the first signal at the peak position again; a process of repeating the process of recording the signal of the specific frequency at a position brought close to the first position from the second position by a predetermined distance and of measuring the signal/noise ratio of the first signal at the peak position again while sequentially getting closer to the first position from the second position; and a process of determining whether the value of the signal/noise ratio has lowered from the initial value by a predetermined range or more.

5 Claims, 5 Drawing Sheets

FIG. 6
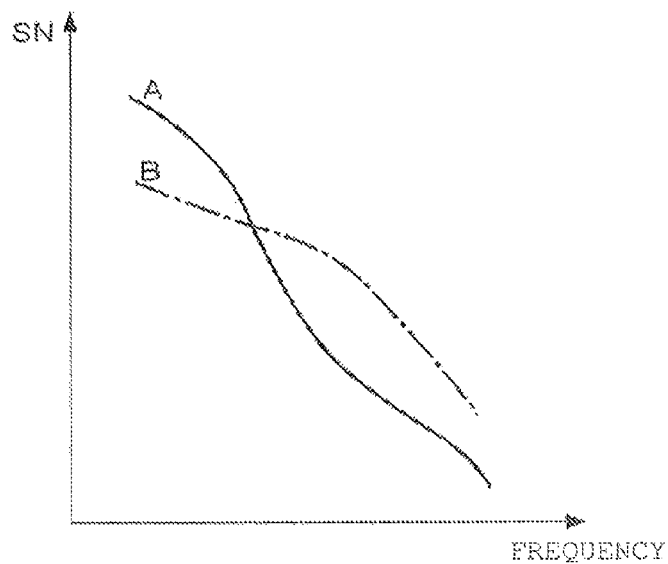
FIG. 7
|  | BPI | (LOW) 1 | 2 | (HIGH) 3 |
|---|---|---|---|---|
| TPI |  |  |  |  |
| (FAR) 1 |  | 5 | 4 | 3 |
| 2 |  | 4 | 3 | 2 |
| (NEAR) 3 |  | 3 | 2 | 1 |
FIG. 8
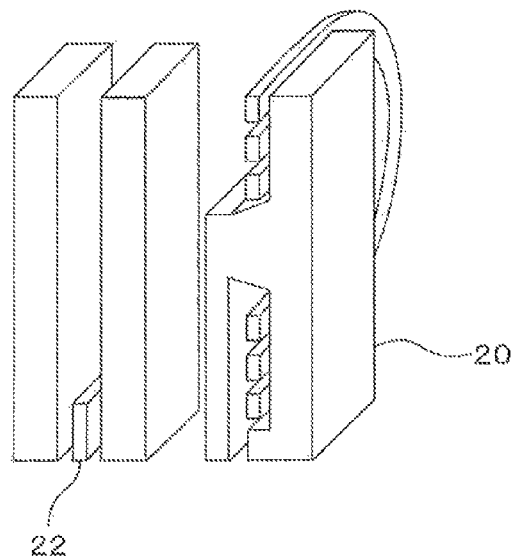

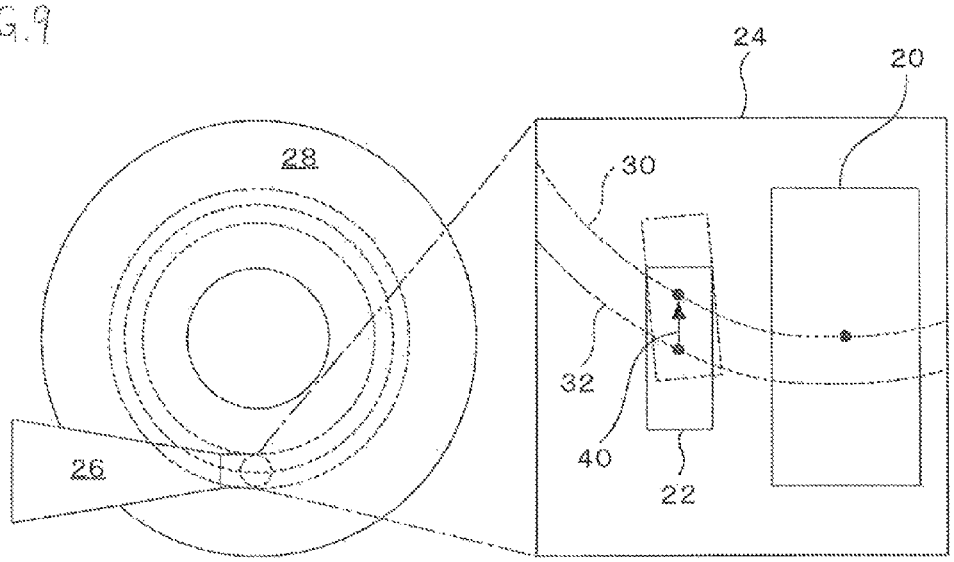

EVALUATION METHOD OF PERPENDICULAR MAGNETIC RECORDING MEDIUM AND MANUFACTURING METHOD OF PERPENDICULAR MAGNETIC RECORDING MEDIUM

CROSS REFERENCE TO RELATED APPLICATIONS

This application is a National Stage of International Application No. PCT/JP2010/060525 filed Jun. 22, 2010, claiming priority based on Japanese Patent Application No. 2009-164086 filed Jul. 10, 2009 the contents of all of which are incorporated herein by reference in their entirety.

BACKGROUND OF THE INVENTION

1. Technical Field

The present invention relates to an evaluation method of a perpendicular magnetic recording medium and a manufacturing method of a perpendicular magnetic recording medium to be mounted on a magnetic disk device such as a perpendicular magnetic recording type HDD (hard-disk drive).

2. Background Art

With the recent trend to higher-capacity information processing, various information recording technologies have been developed. Particularly, a surface recording density of an HDD (hard-disk drive) using the magnetic recording technology has continuously increased by the rate of approximately 100% a year. In recent years, an information recording capacity exceeding 250 G bytes per disk is required for a magnetic disk having a diameter of 2.5 inches used in HDD or the like, and in order to meet such demand, realization of an information recording density exceeding 400 Gbits per 1 square inch is in demand. In order to achieve the high recording density in a magnetic disk used in an HDD or the like, magnetic crystal grains constituting a magnetic recording layer handling recording of an information signal need to be refined, and its layer thickness needs to be reduced at the same time. However, in the case of a prior-art magnetic disk of an in-plane magnetic recording method (also referred to as longitudinal magnetic recording method or horizontal magnetic recording method), development of the refining of the magnetic crystal grains would result in degradation of the thermal stability of the recording signal by superparamagnetic phenomenon. This generates a thermal fluctuation phenomenon causing the recording signal to disappear, which interrupts an increase in recording density of the magnetic disk.

In order to solve this obstructive factor, a magnetic disk of a perpendicular magnetic recording type has been proposed in recent years. In the case of the perpendicular magnetic recording method, unlike the in-plane magnetic recording method, a magnetization easy axis of a magnetic recording layer is adjusted to be oriented in the perpendicular direction with respect to a substrate surface. As compared with the in-plane recording method, the perpendicular magnetic recording method can suppress the thermal fluctuation phenomenon, and this is suitable for higher recording density. A technology relating to a perpendicular magnetic recording medium formed of a soft magnetic layer, an underlayer, a Co perpendicular magnetic recording layer, a protective layer and the like on a substrate in this order is disclosed in Japanese Unexamined Patent Application Publication No. 2002-92865, for example. Moreover, U.S. Pat. No. 6,468,670 discloses a perpendicular magnetic recording medium having a structure in which an artificial lattice film continuous layer (exchange coupling layer) exchange-coupled to a particle recording layer is made to adhere.

At present, higher recording density in the perpendicular magnetic recording medium is in demand.

In order to further improve the recording density of the magnetic recording medium under these circumstances, both a linear recording density (BPI: Bit Per Inch) in the circumferential direction and a track recording density (TPI: Track Per Inch) in the radial direction need to be improved.

In a magnetic recording reproducing head which records/reproduces a signal with respect to such a magnetic recording medium, recording and reproduction is beginning to be performed by separate heads with the trend to a higher density of the magnetic recording technology. Therefore, as illustrated in FIG. 8, a recording head 20 such as a single magnetic polar head, trailing sealed head or the like and a reproduction head 22 such as a large-sized magnetic resistance type (GMR) head, a tunnel magnetic resistance effect type (TuMR) head or the like are arranged separately.

These separate recording head 20 and reproduction head 22 are arranged linearly on a slider, but since the tracks for recording and reproduction are formed circumferentially along the magnetic recording medium, the reproduction head 22 needs to be offset by approximately 169 nm at the maximum, for example, to the inner periphery side in the radial direction with respect to the recording head 20 in order to arrange the recording head 20 and the reproduction head 22 on the tracks.

By referring to FIG. 9, the recording head 20 and the reproduction head 22 placed on the extension line in the longitudinal direction of a suspension 26 are not moved for offset and they are located on separate tracks 30 and 32 on a magnetic recording medium 28, respectively, in the slider 24. Therefore, the reproduction head 22 needs to move from the track 32 to the track 30 with the offset of a predetermined amount 40 in order to reproduce a signal recorded in the track 30 by the recording head 20.

A value of the offset of the reproduction head 22 is acquired through recording/reproduction of an actual signal. For example, the magnetic recording medium is rotated, a signal is recorded in a predetermined on-track position from the recording head 20, and then, the reproduction head 22 is moved, and a position where a reproduction output of the recorded signal becomes the maximum is searched. A movement amount of the reproduction head 22 for this search becomes the value of the offset. This offset is stored in a magnetic disk device, and the recorded signal is accurately reproduced by moving the reproduction head in advance for the stored offset for the next reproduction.

However, set offset might be shifted from actual offset due to a search error of a position where the output signal becomes the maximum, drift of the offset caused by a temperature change of the magnetic disk device and elapse of time and the like. Since a track interval was large and a recordable width in the radial direction was wide in a prior-art medium which has a small recording density, such a small error in the offset was allowed.

However, an influence of such an offset error cannot be ignored in the recent perpendicular magnetic recording medium having a high recording density. For example, recording is made at a position other than the memory region (recordable width) due to the offset error in the magnetic recording medium having a small recordable width, and a signal might be buried in noises and the reproduction head might not be able to identify the signal. Therefore, it becomes also necessary to ensure the recordable width in the radial direction as much as possible while the track recording density is improved.

In order to estimate the recordable width of the magnetic recording medium, a technology is known that an off-track signal different from the on-track one is intentionally recorded on the both sides of the on-track one, a limit position where the on-track signal can be identified from the off-track signal is detected, and this limit position is derived as an off-track margin (Patent Document 1).

However, in such a technology of deriving an off-track margin, a border line with the off-track signal intentionally recorded in a region adjacent to the track is merely derived and the influence of noise (leakage magnetic field) from the adjacent track cannot be measured.

The necessity to ensure some recordable width has been described, but if the recordable width is merely to be ensured in the trend to higher density of the track recording density TPI, the whole track width becomes large, and an influence to the adjacent track is increased. If the influence is large, the recorded contents of the adjacent track might be deleted or its reproduction output might become unstable. Therefore, a magnetic disk having a small influence on the adjacent track is desirable while the recordable width is ensured.

CITATION LIST

Patent Literature

Patent Document 1: Japanese Unexamined Patent Application Publication No. 6-84149

SUMMARY OF THE INVENTION

As described above, an information recording capacity exceeding 250 G bytes per disk has been in demand for a magnetic disk having a diameter of 2.5 inches in the recent magnetic recording mediums for which the perpendicular magnetic recording method is employed. In response to that, the track width has decreased, and the reproduction output of the track can largely affect as noise on the adjacent track. Moreover, in order to develop a magnetic recording medium which can handle much higher recording density of the next generation or in order to improve productivity, recording/reproduction characteristics of the fabricated magnetic recording medium need to be evaluated by performances close to an actual HDD.

The current evaluation methods include an evaluation method of recording/reproduction characteristics of a perpendicular magnetic recording medium by using a spin stand tester provided with an SPT/TMR head and by measuring an MWW (track width) and a bit error at a linear recording density of 1500 kFCI (Kilo Flux Change per inch), for example, and a method of measuring Squash and an S/N ratio (signal/noise ratio) by using an R/W analyzer and a magnetic head of perpendicular magnetic recording method. The Squash is a value which becomes an evaluation index of a decrease rate of a signal due to an influence from the adjacent track. Specifically, writing is made (Data Track) at a set frequency, its track profile is measured, and an Max-TAA (signal output intensity) is recorded. An adjacent track is written at ±Squeeze Position from the center of data track. After that, at the position of the Data track center (Max TAA), the TAA (TAAsquash) is measured. The value usually becomes smaller than the MaxTAA due to the influence of the Adjacent Track. It is Squash=TAAsquash/MaxTAA× 100(%). It is indicated that the larger the value of the Squash is, the smaller the decrease of the signal due to the influence from the adjacent track is.

However, characteristics evaluation considering TPI and BPI is not made in the measurement by using the spin stand tester, and the performance similar to the actual HDD cannot be evaluated by the evaluation method using Squash in which the adjacent track is written once at a predetermined position with respect to the track center or using the S/N ratio measurement of writing in only 1 track.

The present invention was made in view of the prior-art circumstances and has an object to provide a characteristic evaluation method of a perpendicular magnetic recording medium suitable for obtaining a perpendicular magnetic recording medium which can handle much higher recording density and a manufacturing method of a perpendicular magnetic recording medium for which this characteristic evaluation method is employed.

As the result of keen examination with the purpose of solving the above-described prior-art problems, the inventor found that latent characteristics of the respective perpendicular magnetic recording mediums can be evaluated by writing data in a track center, first, and then, writing data in an adjacent track, making a track pitch variable, and evaluating the S/N ratio at a peak position of the center track data and completed the present invention. That is, the present invention has the following configurations in order to solve the above-described problems.

The invention having a configuration 1 is an evaluation method of a perpendicular magnetic recording medium used for information recording in a perpendicular magnetic recording method, including:

a process of rotating a perpendicular magnetic recording medium, moving a recording head in the radial direction of the perpendicular magnetic recording medium, and recording a first signal of a specific frequency at an arbitrary first position in the perpendicular magnetic recording medium;

a process of measuring a reproduction output of the first signal recorded at the first position while moving a reproduction head in the radial direction of the perpendicular magnetic recording medium and by measuring a signal/noise ratio (initial value) of the first signal at a peak position where the reproduction output becomes the maximum;

a process of recording a signal of a specific frequency by using the recording head at a second position away from the first position by a predetermined distance in the radial direction of the perpendicular magnetic recording medium;

a process of measuring the signal/noise ratio of the first signal at the peak position again;

a process of repeating the process of recording the signal of the specific frequency at a position brought close to the first position from the second position by a predetermined distance using the recording head and of measuring the signal/noise ratio of the first signal at the peak position again while sequentially getting closer to the first position from the second position; and a process of determining whether the value of the measured signal/noise ratio has lowered from the initial value by a predetermined range or more.

Moreover, the invention of a configuration 2 is an evaluation method of a perpendicular magnetic recording medium described in the configuration 1, characterized in that the evaluation is made by varying the frequency of the first signal.

Moreover, the invention of a configuration 3 is an evaluation method of a perpendicular magnetic recording medium described in the configuration 1 or 2, characterized in that the predetermined distance between the first position and the second position is a track width at a point of 40 to 60% of the maximum value (50%, for example) of the reproduction output of the first signal recorded at the first position.

Moreover, the invention of a configuration 4 is an evaluation method of a perpendicular magnetic recording medium described in any of the configurations 1 to 3, characterized in that in the process of determination, it is determined whether or not the value of the measured signal/noise ratio has fallen from the initial value by 0.5 to 3 dB (1 dB, for example) or more.

Moreover, the invention of a configuration 5 is a manufacturing method of a perpendicular magnetic recording medium, characterized by including a recording/reproduction characteristic evaluation process of a perpendicular magnetic recording medium to which the evaluation method of a perpendicular magnetic recording medium described in any of the configurations 1 to 4 is applied.

According to the present invention, by writing data in a track center, and then, by writing data in an adjacent track, by making at least a track pitch variable and by evaluating the S/N ratio at the peak position of the center track data, the performance similar to a use state mounted on an actual HDD can be evaluated. Moreover, the latent characteristics of the respective perpendicular magnetic recording mediums can be evaluated, and thus, a characteristic evaluation method of a perpendicular magnetic recording medium suitable for obtaining a perpendicular magnetic recording medium which can respond to much higher recording density can be provided.

Moreover, by determining whether or not the medium can achieve a set surface recording density by conducting the evaluation in a shipment test during production, a medium which was not offered for use in the prior-art technology can be used, and productivity can be improved.

Furthermore, according to the manufacturing method of a perpendicular magnetic recording medium including the recording/reproduction characteristic evaluation process of the perpendicular magnetic recording medium to which such evaluation method of a perpendicular magnetic recording medium is applied, a perpendicular magnetic recording medium which can respond to much higher recording density can be obtained.

BRIEF DESCRIPTION OF THE DRAWINGS

FIG. 6 is a diagram illustrating an example of an evaluation result of the S/N ratio and the frequency of the perpendicular magnetic recording medium on the basis of the evaluation method of the present invention.

FIG. 7 is a diagram illustrating an example of an evaluation result of the perpendicular magnetic medium considering TPI and BPI.

FIG. 8 is a perspective view of the magnetic recording reproduction head in which a recording head and a reproduction head are separate.

FIG. 9 is a plan view for explaining a positional relationship between the recording head and the reproduction head.

DETAILED DESCRIPTION OF THE INVENTION

An embodiment of the present invention will be described below in detail.

First, an outline of a perpendicular magnetic recording medium to which an evaluation method of the present invention is applied will be described.

Figure 1:
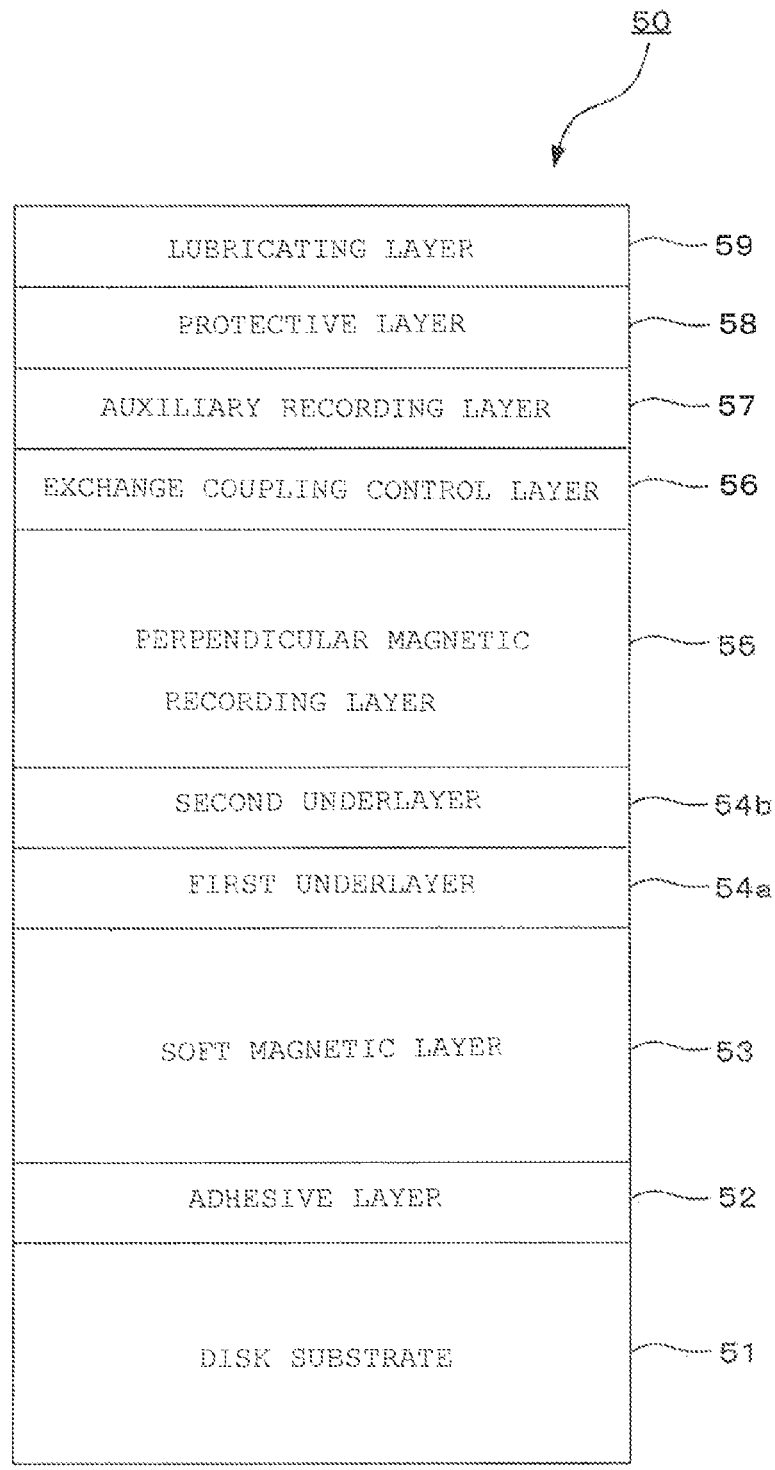
FIG. 1 is a sectional diagram illustrating an example of an outline layered configuration of a perpendicular magnetic recording medium.

FIG. 1 is a sectional diagram illustrating an example of an outline layered configuration of the perpendicular magnetic recording medium. As illustrated in FIG. 1, an embodiment of the layered configuration of the perpendicular magnetic recording medium 50 specifically has an adhesive layer 52, a soft magnetic layer 53, a first underlayer 54a, a second underlayer 54b, a perpendicular magnetic recording layer 55, an exchange coupling control layer 56, an auxiliary recording layer 57, a protective layer 58, a lubricating layer 59 and the like, for example, laminated on a disk substrate 51 from the side closer to the substrate.

As the above-described disk substrate 51, glass substrates, aluminum substrates, silicon substrates, plastic substrates and the like can be used, for example. Particularly, glass substrates are preferable, and glasses for a substrate include aluminosilicate glass, aluminoborosilicate glass, soda-time glass and the like, and aluminosilicate glass among them is suitable. Amorphous glass and crystallized glass can be also used. Chemically reinforced glass is high in rigidity and preferable.

The soft magnetic layer 53 which favorably adjusts magnetic circuit of the perpendicular magnetic recording layer is preferably provided on the disk substrate 51. Such soft magnetic layer is preferably configured so as to include an AFC (Antiferro-magnetic exchange coupling) by interposing a non-magnetic spacer layer between a first soft magnetic layer and a second soft magnetic layer, for example. As a result, magnetization directions of the first soft magnetic layer and the second soft magnetic layer can be aligned in anti-parallel with high accuracy, and a noise generated from the soft magnetic layer can be reduced. Specifically, the compositions of the first soft magnetic layer and the second soft magnetic layer can be, for example, CoTaZr (cobalt-tantalum-zirconium) or CoFeTaZr (cobalt-iron-tantalum-zirconium). The composition of the spacer layer can be, for example, Ru (ruthenium).

The adhesive layer 52 is preferably formed between the substrate 51 and the soft magnetic layer 53. Since adhesion between the substrate and the soft magnetic layer can be improved by forming the adhesive layer, separation of the soft magnetic layer can be prevented. A Ti containing material can be used, for example, as the material of the adhesive layer.

Moreover, the underlayer (the first underlayer 54a and the second underlayer 54b) are used for preferably controlling crystalline orientation (the crystalline orientation is oriented in the perpendicular direction with respect to the substrate surface), crystal grain size, and grain boundary segregation of the perpendicular magnetic recording layer. As the material for the underlayer, a single body having a hexagonal close-packed (hcp) structure or an alloy is preferable, and particularly, Ru or its alloy is preferably used. In the case of Ru, an action for controlling a crystal axis (c-axis) of a CoPt perpendicular magnetic recording layer having an hcp crystalline structure to be oriented in the perpendicular direction is high and suitable.

Moreover, the perpendicular magnetic recording layer 55 preferably includes a ferromagnetic layer with a granular structure having crystal particles primarily including cobalt (Co) and a grain boundary portion primarily including an oxide of Si, Ti, Cr, Co or the like.

Specifically, as the Co magnetic material constituting the ferromagnetic layer, a material which molds an hcp crystalline structure by using a target of a hard magnetic body made of CoCrPt (cobalt-chromium-platinum) containing silicon oxide, titanium oxide ($TiO_2$) and the like, which are non-magnetic substances, is preferable. Moreover, the film thickness of this ferromagnetic layer is preferably 20 nm or less, for example.

Moreover, high heat resistance can be added to writing performances and low noise characteristics of the magnetic recording layer by providing the auxiliary recording layer 57 on the top of the perpendicular magnetic recording layer 55 through the exchange coupling control layer 56. The composition of the auxiliary recording layer can be CoCrPtB, for example.

Moreover, the exchange coupling control layer 56 is preferably provided between the perpendicular magnetic recording layer 55 and the auxiliary recording layer 57. By providing the exchange coupling control layer, the recording/reproducing characteristics can be optimized by favorably controlling strength of exchange coupling between the perpendicular magnetic recording layer and the auxiliary recording layer. As the exchange coupling control layer, Ru is preferably used, for example.

Moreover, the protective layer 58 is preferably provided on the auxiliary recording layer 57. By providing the protective layer, the magnetic recording medium surface can be protected from the magnetic head floating and flying over the magnetic recording medium. As the material of the protective layer, a carbon protective layer, for example, is preferable.

Moreover, the lubricating layer 59 is preferably further provided on the protective layer 58. By providing the lubricating layer, abrasion between the magnetic head and the magnetic recording medium can be suppressed, and durability of the magnetic recording medium can be improved. As the material of the lubricating layer, a PFPE (perfluoropolyether) compound, for example, is preferable.

The higher the recording density is, the more the antimagnetic field is decreased in such perpendicular magnetic recording medium 50, and thus, high TPI and BPI can be obtained. Therefore, the evaluation method according to the present invention in which characteristic evaluation is made considering TPI and BPI of the respective mediums and the performances can be evaluated similar to the use state mounted on an actual HDD is a characteristic evaluation method of a perpendicular magnetic recording medium suitable for obtaining a perpendicular magnetic recording medium which can respond to much higher recording density.

Subsequently, the evaluation method of a perpendicular magnetic recording medium according to the present invention will be described.

(1) First, the perpendicular magnetic recording medium is rotated, the magnetic head is moved in the radial direction of the perpendicular magnetic recording medium and a first signal of a specific frequency is recorded at an arbitrary first position in the perpendicular magnetic recording medium.

The first position is arbitrary, but it is particularly preferable at substantially an intermediate point in the recording region width in the radial direction of the perpendicular magnetic recording medium. The reason why substantially the intermediate point is preferably selected is to eliminate a fluctuation factor such as skewing. The head has zero skewing in the vicinity of a middle periphery.

The specific frequency of the first signal to be recorded first can be also selected arbitrarily, but it is particularly preferably selected within a range from 1/10 of the highest frequency used with the intended recording density to the highest frequency used with the intended recording density.

Figure 2:
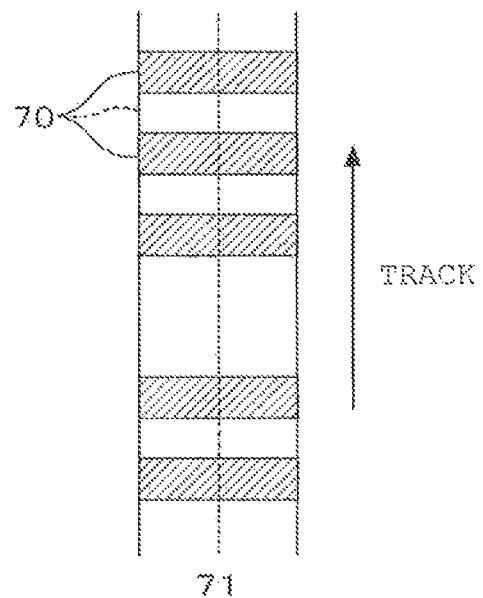
FIG. 2 is an explanatory diagram illustrating a trajectory on a magnetic recording medium of a recording reproduction head.

FIG. 2 is an explanatory diagram illustrating a trajectory of the recording/reproduction head on the magnetic recording medium 50.

Figure 3:
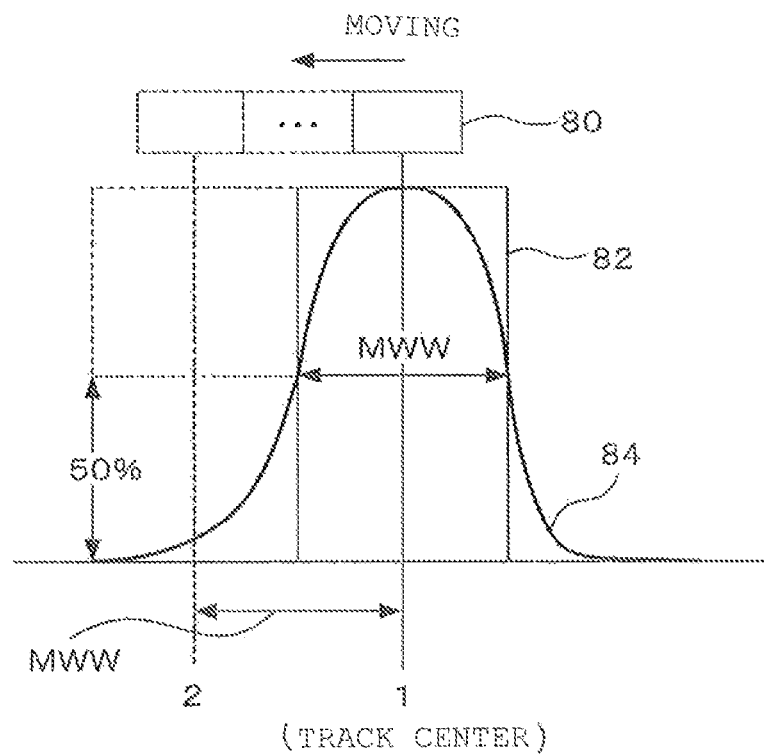
FIG. 3 is a diagram schematically illustrating a reproduction output of a signal for explaining an evaluation method according to the present invention.
Figure 4:
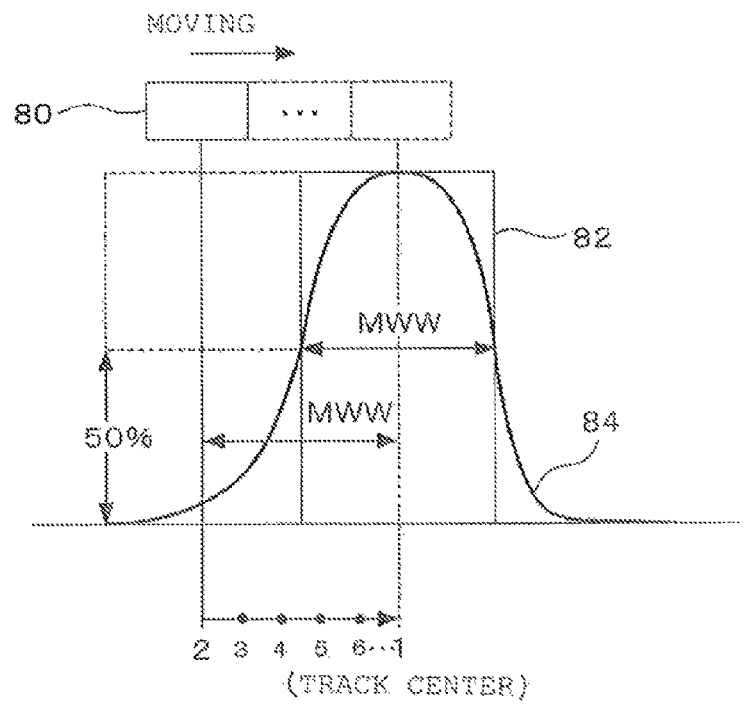
FIG. 4 is a diagram similarly schematically illustrating the reproduction output of the signal for explaining an evaluation method according to the present invention.

FIGS. 3 and 4 are diagrams schematically illustrating a reproduction output of a signal both for explaining the evaluation method according to the present invention. As illustrated in FIG. 2, the recording head (See FIG. 8) continuously records information of 1 bit 70 each along an arbitrary track on the magnetic recording medium 50, and the reproduction head (See FIG. 8) moves preferably to the center 71 in the radial direction of the recorded signal and reproduces the signal.

The reproduced signal is measured by a spin stand (electromagnetic conversion characteristic evaluating device) while the magnetic head is shifted in the radial direction (in a cross-track direction), and a track profile 84 as indicated by a bold line in FIG. 3 is formed. The track profile 84 is a trajectory of a reproduction output value in the track width direction. Reproduction output distribution in the track direction can be grasped by using such track profile 84.

As illustrated in FIG. 3, the track profile 84 obtained by reproducing a recorded signal 82 recorded by the recording head 80 having a width of a predetermined value (180 nm, for example) by the reproduction head is attenuated along a gradually decreasing curve as it separates away in the radial direction from the center of the recorded signal 82 (track center: the position of "1" in FIG. 3). This attenuation indicates that the force to hold the recorded signal is weak at a position away from the track center. A width between output points at points between 40 to 60% (50%, for example) of the maximum value of the track profile 84 is referred to as a track width MWW (Magnetic Write Width). To be accurate, the MWW is a length between points (40 to 60% or 50%, for example) of the respective approximate curves of right and left curves of 20 to 80% in the track profile 84, and the MWW becomes the width of the recorded signal.

The width between the output points at point between 50% of the maximum value of the track profile 84 is indicated as the track width MWW in FIGS. 3 and 4.

(2) Subsequently, an S/N ratio (signal/noise ratio) of the first signal at the peak position where the reproduction output becomes the maximum is measured. That is, in this embodiment, the S/N ratio at the peak position of the center track data is measured. The value of the S/N ratio of the first signal measured at this time is defined as an initial value in the present invention.

Specifically, the reproduction output signal is subjected to spectrum analysis by using a spectrum analyzer, the signal of the specific frequency is separated from the other noises, and the S/N ratio is derived. The reproduction output can be reliably divided into the signal and the noise by using the spectrum analyzer, and the S/N ratio at the track center can be easily measured.

(3) Subsequently, a signal of a specific frequency is recorded at a second position separated from the first position in the radial direction of the perpendicular magnetic recording medium by a predetermined distance by using the recording head.

In this embodiment, for example, the signal of the specific frequency is recorded at the second position (the position of "2" in FIG. 3) away from the track center (first position) in the radial direction of the perpendicular magnetic recording medium only by MWW. The specific frequency in this case is preferably substantially the same as the specific frequency of the first signal written in the track center.

The width between the first position and the second position separated by a predetermined distance does not have to be limited to MWW in the present invention, but since disappearance/erasing of data (interference between tracks) is different depending on the medium, the width is preferably set to MWW considering individual characteristics.

(4) Subsequently, the signal/noise ratio of the first signal at the peak position is measured again.

That is, the reproduction signal at the track center is reproduced and the S/N ratio at the peak position of the center track data is measured by using the spectrum analyzer.

Considering variation in data, the processes of (1) to (4) may be repeatedly executed as necessary.

(5) Subsequently, the signal of the specific frequency is recorded at a position brought close from the second position in a direction of the first position by a predetermined distance.

For example, in this embodiment, as illustrated in FIG. 4, the signal of the specific frequency is recorded at a third position (the position of "3" in FIG. 4) brought close from the second position in the direction of the first position (track center) by a predetermined distance. The specific frequency in this case is preferably substantially the same as the specific frequency of the first signal written in the track center.

(6) Subsequently, the signal/noise ratio of the first signal at the peak position is measured again.

That is, the reproduction signal at the track center is reproduced, and the S/N ratio at the peak position of the center track data is measured by using the spectrum analyzer.

(7) The above process of recording the signal of the specific frequency at the position brought close from the second position in the direction of the first position by the predetermined distance and of measuring the signal/noise ratio of the first signal at the peak position again is repeated while sequentially getting close from the second position in the direction of the first position.

For example, in this embodiment, as illustrated in FIG. 4, the processes of (5) and (6) are repeatedly executed by sequentially getting close from the second position in the direction of the first position (track center) to a fourth position (the position of "4" in FIG. 4), to a fifth position (the position of "5" in FIG. 4), to a sixth position (the position of "6" in FIG. 4) . . . . The pitch of getting close as above can be set arbitrarily.

(8) Then, it is determined whether or not the value of the signal/noise ratio of the measured first signal at the peak position has fallen from the initial value by a predetermined range or more, and the evaluation process is finished when the value has fallen from the initial value by 1 dB or more, for example.

Naturally, a threshold value in this case does not have to be limited to 1 dB, but in order to improve the working effect by the evaluation method of the present invention, the threshold value is preferably set within a range from 0.5 to 3 dB, for example.

Subsequently to that, evaluation may be made by similarly executing the processes of (1) to (8) while varying the specific frequency of the first signal to be written in the track center first. By evaluating fluctuation in the S/N ratio at the peak position by making not only the track pitch but the frequency variable, the characteristic evaluation considering both the TPI and BPI of the respective mediums can be made and the performances in the state closer to the use state on the actual HDD can be evaluated.

Figure 5:
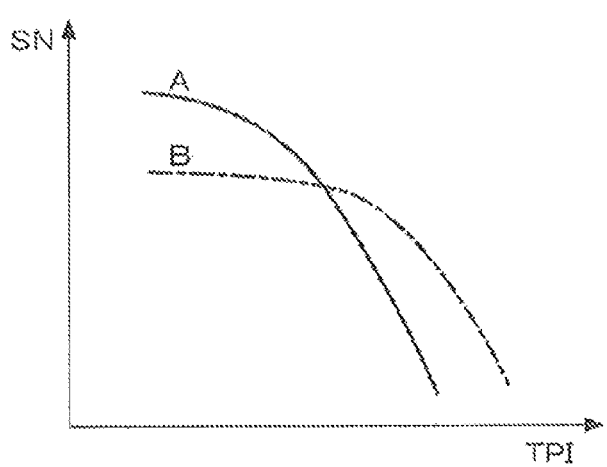
FIG. 5 is a diagram illustrating an example of an evaluation result of an S/N ratio and TPI of the perpendicular magnetic recording medium on the basis of the evaluation method of the present invention.

FIG. 5 is a diagram illustrating an example of the evaluation result of the S/N ratio and TPI of the perpendicular magnetic recording mediums on the basis of the evaluation method of the present invention (the "SN" on the vertical axis refers to an S/N ratio).

According to the example of the evaluation result illustrated in FIG. 5, the perpendicular magnetic recording medium A has a favorable S/N ratio in a low TPI region, but the S/N ratio rapidly deteriorates in a high TPI region. On the other hand, the perpendicular magnetic recording medium B has a less favorable S/N ratio than that of the medium A in the low TPI region but has a more favorable S/N ratio than that of the medium A in the high TPI region. It becomes possible to determine which one is more suitable as a perpendicular magnetic recording medium which can respond to much higher recording density in the future on the basis of such evaluation results.

FIG. 6 is a diagram illustrating an example of the evaluation result of the S/N ratio and the frequency of the perpendicular magnetic recording mediums on the basis of the evaluation method of the present invention (the "SN" on the vertical axis refers to an S/N ratio).

By means of evaluation by making not only the track pitch but also the frequency of the recorded signal variable, the relationship between the S/N ratio and the frequency of the respective perpendicular magnetic recording mediums as illustrated in FIG. 6 can be evaluated.

According to the example of the evaluation result illustrated in FIG. 6, it is known that the perpendicular magnetic recording medium. A has a favorable S/N ratio in a low frequency (that is, low BPI) region, but the S/N ratio rapidly deteriorates in a high frequency (that is, high BPI) region. On the other hand, the perpendicular magnetic recording medium B has a less favorable S/N ratio than that of the medium A in the low frequency region but has a more favorable S/N ratio than that of the medium A in the high frequency region. It becomes possible to determine which one is more suitable as a perpendicular magnetic recording medium which can respond to much higher recording density in the future or which can achieve a set surface recording density (500 Gb/inch$^2$, for example) on the basis of such evaluation results.

In the case of the perpendicular magnetic recording mediums A and B whose evaluation results are illustrated in FIGS. 5 and 6, the both relationships between the S/N ratio and TPI as well as the S/N ratio and the frequency show the same tendency, but naturally, they might show different tendencies depending on the mediums. In the latter case, the evaluation particularly considering both TPI and BPI is preferably made.

FIG. 7 is a chart illustrating an example of an evaluation result of the perpendicular magnetic recording medium considering TPI and BPI.

The TPI is assigned to the vertical axis and the BPI to the lateral axis in the chart in FIG. 7, respectively, and the higher (farther) TPI side is set to 1 and the lower (closer) TPI side is set to 3, while the lower BPI (low frequency) side is set to 1 and the high BPI (high frequency) side is set to 3, for example. Moreover, the characteristics in each block area of the chart in FIG. 7 is evaluated on the 5-point scale of "1" to "5", for example, on the basis of the evaluation results in FIGS. 5 and 6.

TPI×BPI represents surface recording density, and thus, the characteristic evaluation considering the surface recording density obtained by multiplying the TPI in the radial direction by the BPI in the circumferential direction of the respective mediums can be made.

Comprehensively considering the evaluation results according to FIG. 7 as above, it becomes possible to easily determine which one is more suitable as a perpendicular magnetic recording medium which can respond to much higher recording density in the future or which one can achieve a set surface recording density (500 Gb/inch$^2$, for example).

According to the evaluation method of the present invention, even in the mediums evaluated by the prior-art evaluation method to be poor in the S/N ratio or Squash, the mediums which actually keep a high S/N ratio and are capable of high TPI can be selected, and the latent characteristics of the respective perpendicular magnetic recording mediums can be correctly evaluated.

As described above, according to the present invention, by evaluating the S/N ratio at the peak position of the center track data by writing data in the track center and then, by writing the data in the adjacent track and by making at least the track pitch variable, the performances similar to the use state mounted on an actual HDD can be evaluated, and the latent characteristics of the respective perpendicular magnetic recording mediums can be evaluated. Thus, a characteristic evaluation method of a perpendicular magnetic recording medium suitable for obtaining a perpendicular magnetic recording medium which can respond to much higher recording density can be provided.

Moreover, by means of evaluation by making the frequency of the recorded signal variable in addition to the track pitch, the characteristic evaluation considering not only the TPI of the respective mediums but also the BPI in the circumferential direction can be made.

Moreover, the present invention also provides a manufacturing method of a perpendicular magnetic recording medium for which the evaluation method of the perpendicular magnetic recording medium described above is employed. That is, according to the manufacturing method of the perpendicular magnetic recording medium including the process of recording/reproduction characteristic evaluation of the perpendicular magnetic recording medium to which the evaluation method of the perpendicular magnetic recording medium described above according to the present invention is applied, the characteristics of the respective perpendicular magnetic recording mediums can be correctly evaluated and selected. As a result, a perpendicular magnetic recording medium which can respond to much higher recording density can be obtained. Also, even a medium evaluated by the prior-art evaluation to be an unacceptable medium might be able to be used by determining whether or not the medium can achieve the set surface recording density (500 Gb/inch$^2$, for example), and improvement of productivity can be expected.

REFERENCE SIGNS LIST 50 perpendicular magnetic recording medium
51 disk substrate
52 adhesive layer
53 soft magnetic layer
54a, 54b first, second underlayer
55 perpendicular magnetic recording layer
56 exchange coupling control layer
57 auxiliary recording layer
58 protective layer
59 lubricating layer

The invention claimed is:

1. An evaluation method of a perpendicular magnetic recording medium used for information recording of a perpendicular magnetic recording type, comprising:
   a process of rotating a perpendicular magnetic recording medium, moving a recording head in a radial direction of said perpendicular magnetic recording medium, and recording a first signal of a specific frequency at an arbitrary first position in said perpendicular magnetic recording medium;
   a process of measuring a reproduction output of said first signal recorded at said first position while moving a reproduction head in the radial direction of said perpendicular magnetic recording medium and by measuring an initial value of a signal/noise ratio of said first signal at a peak position where the reproduction output becomes the maximum;
   a process of recording a signal of a specific frequency by using said recording head at a second position away from said first position by a predetermined distance in the radial direction of said perpendicular magnetic recording medium;
   a process of measuring the signal/noise ratio of said first signal at said peak position again;
   a process of repeating the process of recording the signal of the specific frequency at a position brought close to said first position from said second position by a predetermined distance using said recording head and of measuring the signal/noise ratio of said first signal at said peak position again while sequentially getting closer to said first position from said second position; and
   a process of determining whether the value of the measured signal/noise ratio has lowered from the initial value by a predetermined range or more.

2. The evaluation method of a perpendicular magnetic recording medium according to claim 1, wherein
   the evaluation is made by varying the frequency of said first signal.

3. The evaluation method of a perpendicular magnetic recording medium according to claim 1, wherein
   the predetermined distance between said first position and said second position is a track width at a point of 40 to 60% of the maximum value of the reproduction output of said first signal recorded at said first position.

4. The evaluation method of a perpendicular magnetic recording medium according to claim 1, wherein
   in said process of determination, whether or not the value of the measured signal/noise ratio has fallen from the initial value by 0.5 to 3 dB or more is determined.

5. A manufacturing method of a perpendicular magnetic recording medium, comprising:
   a recording/reproduction characteristic evaluation process of a perpendicular magnetic recording medium to which the evaluation method of a perpendicular magnetic recording medium according to claim 1 is applied.

* * * * *